(No Model.)
L. G. CAREAGA Y SAENZ.
PUMP.
No. 295,734. Patented Mar. 25, 1884.
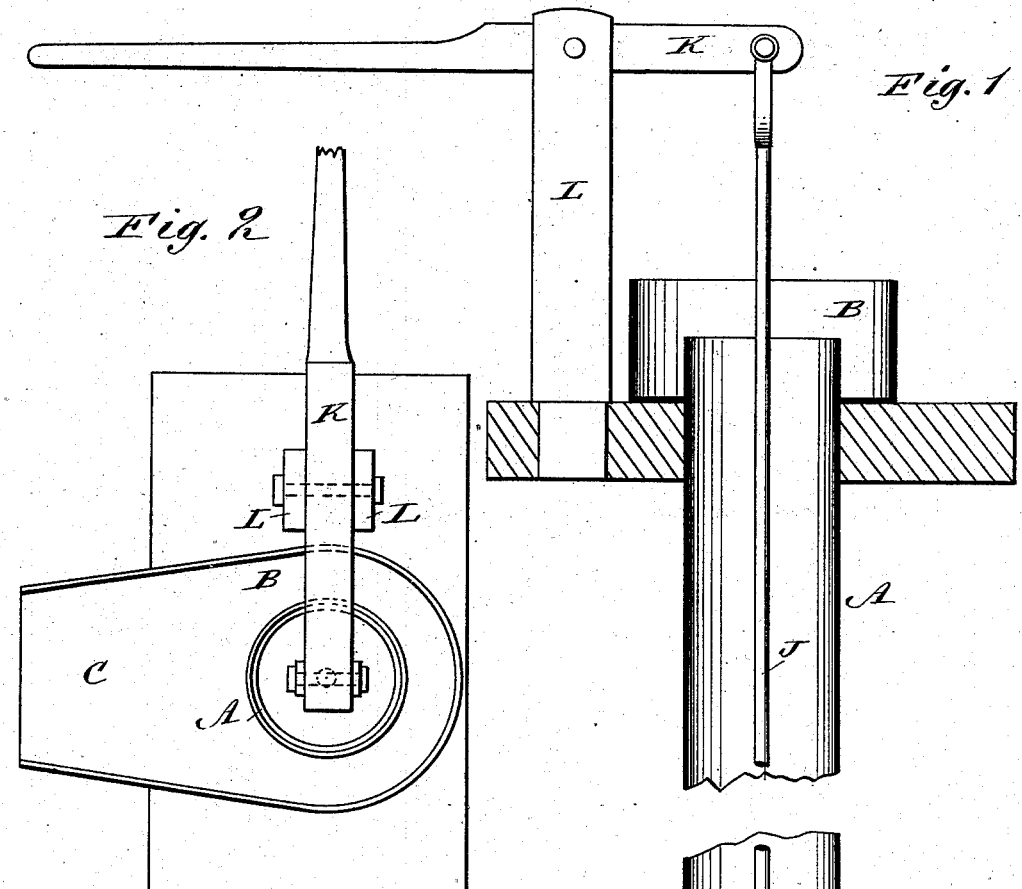
Fig. 1
Fig. 2
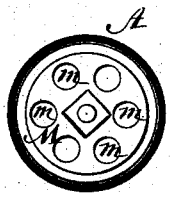
Fig. 3
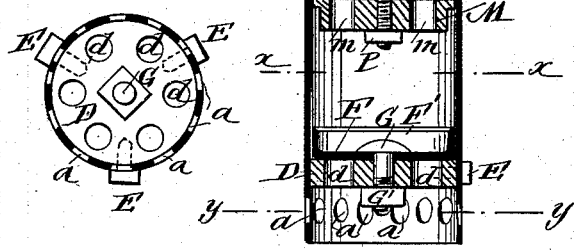
Fig. 4
WITNESSES:
C. Neveux
C. Sedgwick
INVENTOR:
L. G. C. y Saenz
BY Munn & Co
ATTORNEYS.

UNITED STATES PATENT OFFICE.

LUIS G. CAREAGA Y SAENZ, OF PUEBLA, MEXICO.

PUMP.

SPECIFICATION forming part of Letters Patent No. 295,734, dated March 25, 1884.

Application filed May 5, 1883. (No model.) Patented in Mexico December 17, 1877.

*To all whom it may concern:*

Be it known that I, LUIS G. CAREAGA Y SAENZ, of Puebla, Mexico, have invented a new and Improved Pump, of which the following is a full, clear, and exact description.

The object of my invention is to provide an improved pump by means of which a large quantity of water can be raised with very little power, which pump is very simple in construction and not apt to get out of order.

Reference is to be had to the accompanying drawings, forming a part of this specification, in which similar letters of reference indicate corresponding parts in all the figures.

Figure 1 is a longitudinal sectional elevation of my improved pump. Fig. 2 is a plan view of the same. Fig. 3 is a sectional plan view of the same on the line $x$ $x$, Fig. 1. Fig. 4 is an inverted sectional plan view of the same on the line $y$ $y$, Fig. 1.

A pump-barrel, A, is provided at its upper end with an overjutting reservoir or basin, B, which has a spout, C, the upper end of the barrel projecting slightly above the bottom of the basin or reservoir. The lower end of the barrel is open, and directly above the lower edge is provided with a ring of apertures, $a$, for the entrance of water. Directly above the said apertures a disk, D, fitting closely in the barrel, is held transversely in the same by means of bolts E, screwed through the thickness of the barrel into the edge of the disk. The said disk is provided with a series of apertures, $d$, and on the said disk a circular valve, F, is held, which is made of rubber, leather, or analogous material, and is provided with an upwardly-projecting annular flange, F', which fits closely against the inner surface of the barrel, the disk D forming the seat for the said valve F. The valve F is held at its middle to the upper surface of the disk D by a screw-bolt, G, passed through the valve F, and through a central aperture in the disk D, on the lower end of which bolt G a nut, G', is screwed. If the valve is to be replaced, the disk D can easily be removed by loosening the bolts E. A pump-rod, J, has its upper end pivoted to one end of a pump-lever, K, pivoted to standards L. To the lower end of the pump-rod J a disk, M, is held, which fits closely in the pump-barrel, and is provided with a series of apertures, $m$. A valve, N, made of rubber, leather, or analogous material, and provided with an upwardly-projecting annular flange, N', is held on the upper surface of the disk M by a nut, O, screwed on the pump-rod J. A nut, P, is screwed on that end of the pump-rod projecting from the bottom of the disk M.

The operation is as follows: By working the pump-rod the disk M and the valve N will be reciprocated vertically within the pump-barrel, and if the said disk and valve are raised a vacuum will be produced between the valves N and F, which vacuum is filled by water passing from the bottom of the pump-barrel through the apertures $d$ in the disk D, which water raises the valve F. The valve F serves as a check-valve and prevents the water in the lower part of the barrel from flowing out again, and when the disk M on the lower end of the pump-rod is forced down into the water above the valve F the said water passes through the apertures $m$, forces upward the valve N, and is carried upward by the said valve, until finally the entire barrel is filled, and the water flows over the top of the barrel into the basin or reservoir B and out through the spout C. The number of the apertures in the disks D and M can be varied as may be desired and as circumstances may require, and likewise the diameter of the barrel may be varied according to the quantity of water to be raised. The above-described pump is not apt to be clogged by sand or other analogous impurities, and is of such simple construction that it can easily be repaired in any parts becoming damaged or injured.

Having thus described my invention, I claim as new and desire to secure by Letters Patent—

In a pump, the combination, with a pump-barrel, A, of a sucker and rod, the apertured disk D, the circular valve F, made of rubber or leather and held on the disk D, and the bolts E, passing through the thickness of the barrel into the edge of the disk D, substantially as herein shown and described, and for the purpose set forth.

LUIS G. CAREAGA Y SAENZ.

Witnesses:
YNNAEL RIVERO,
ALFREDO SEROUX.